United States Patent [19]
Matsumoto et al.

[11] Patent Number: 5,995,575
[45] Date of Patent: Nov. 30, 1999

[54] IN-CORE GUIDE TUBE RESTRAINT FOR A BOILING WATER REACTOR

[75] Inventors: Jack T. Matsumoto, Sunnyvale; Alex B. Fife, San Jose; Charles A. Dalke, Morgan Hill, all of Calif.

[73] Assignee: General Electric Company, Schenectady, N.Y.

[21] Appl. No.: 09/016,898

[22] Filed: Feb. 2, 1998

Related U.S. Application Data

[60] Provisional application No. 60/057,545, Aug. 29, 1997.

[51] Int. Cl.$^6$ ...................................................... G21C 9/00
[52] U.S. Cl. ............................ 376/303; 376/286; 376/277
[58] Field of Search ..................................... 376/203, 254, 376/260, 277, 285, 286, 292, 302, 303, 353, 461, 463

[56] References Cited

U.S. PATENT DOCUMENTS

| | | | |
|---|---|---|---|
| 3,682,774 | 8/1972 | Beyer | 376/302 |
| 5,912,936 | 6/1999 | Charnley et al. | 376/286 |

*Primary Examiner*—Daniel D. Wasil
*Attorney, Agent, or Firm*—Armstrong Teasdale LLP

[57] ABSTRACT

A restraint assembly which is a bolted lattice structure for preventing the in-core guide tubes from experiencing excessive flow induced vibrations is described. In one embodiment, the restraint assembly includes upper and lower restraint brackets secured to an in-core housing and in-core guide tube assembly. The restraint brackets are located approximately equal distance from the end supports of the in-core guide tube and in-core housing assembly. The upper restraint bracket is welded between sections of the in-core guide tube, and the lower restraint bracket is welded between the in-core guide tube and the in-core housing. Each bracket includes four flanges, and each flange has tapped, or threaded, openings therein. Each bracket also includes cylindrical sections extending from the flanges, and in one embodiment, the cylindrical sections have inner and outer diameters which match the inner and outer diameters of the in-core housing and the in-core guide tube. The brackets are interconnected by plates and threaded bolts. More specifically, the brackets of each ICGT and ICH assembly are connected to brackets of adjacent assemblies by plates and bolts. The bolts are sized and torqued to ensure that a sufficient preload is maintained to prevent any slippage. The bolt heads are tack welded to the restraint plates after final assembly. The assembly also includes a shroud attachment plate and a restraint support bracket configured to be welded to a shroud.

20 Claims, 4 Drawing Sheets

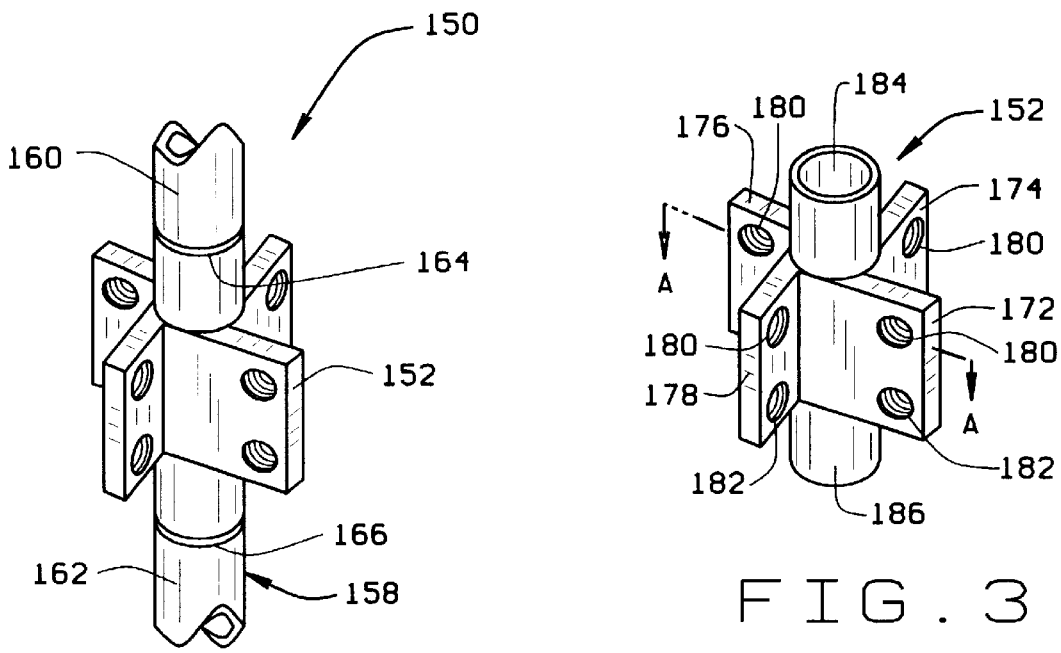
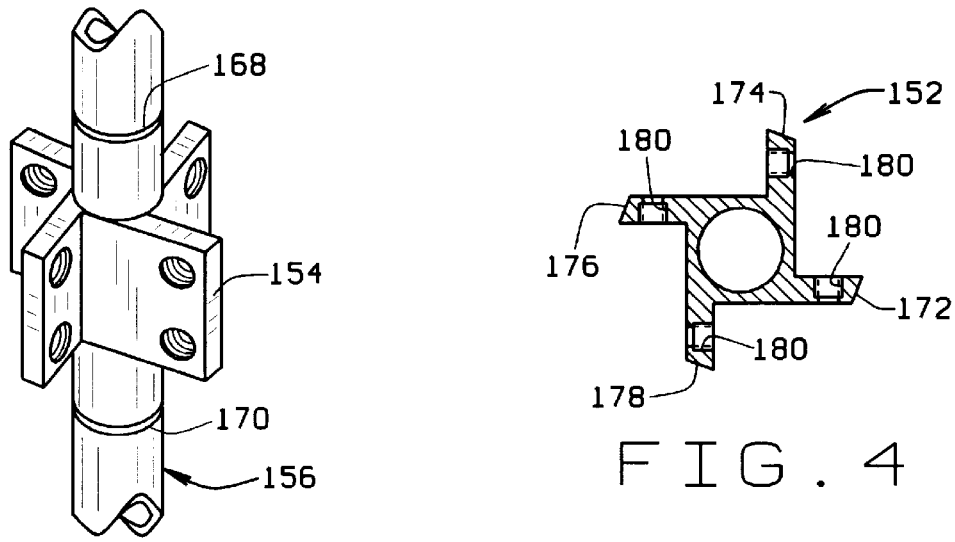
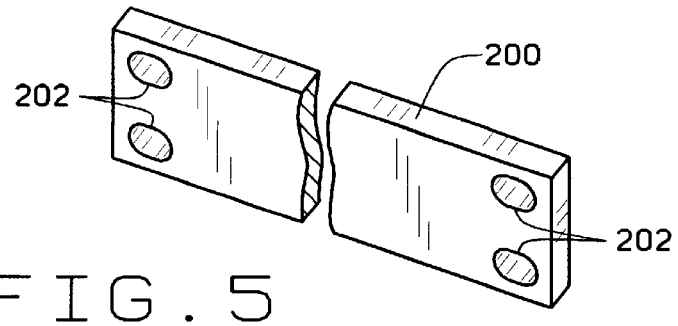

IN-CORE GUIDE TUBE RESTRAINT FOR A BOILING WATER REACTOR

CROSS REFERENCE TO RELATED APPLICATION

This application claims the benefit of U.S. Provisional Application Ser. No. 60/057,545, filed Aug. 29, 1997.

FIELD OF THE INVENTION

This invention relates generally to boiling water reactors and more particularly, to a restraint assembly for in-core guide tubes.

BACKGROUND OF THE INVENTION

Boiling water nuclear reactors typically include a reactor core located within a reactor pressure vessel (RPV). A known RPV includes a substantially cylindrical shell. The shell, for example, can be about twenty feet in diameter and about seven inches thick. The cylindrical shell is closed at its top end by a removable top head. The top head is removable so that components, such a fuel bundles, located in the RPV can be accessed. The RPV cylindrical shell is closed at its bottom end by a dome shaped bottom head assembly welded to the shell. A plurality of openings, sometimes referred to as penetrations, are formed in the bottom head dome so that components can extend within the RPV.

For example, in-core guide tubes (ICGT) and in-core housings (ICH) are long tubes which are welded together end to end to form an assembly, and the ICGT and ICH support and protect the in-core instrumentation. The bottom end of the ICH penetrates the bottom of the reactor pressure vessel and is welded to the bottom head dome. Welding the ICH to the bottom head dome provides rotational, vertical and horizontal support of the assembly. The top end of the ICGT penetrates the core plate, and the ICGT makes a slip fit with the core plate. The slip fit with the core plate provides only horizontal support of the assembly. The distance between upper and lower end supports is approximately 16 feet.

During operation, fluid flows along the outside of the ICH/ICGT assembly. Particularly, fluid flows parallel to the axis of the assembly as well as across the assembly. Such flow causes flow induced vibrations (FIV) in the assembly. If unsupported between the ends, the ICH/ICGT assembly would experience vibration levels above acceptable limits.

Known restraints for the ICH/ICGT assembly include a lattice arrangement of bolted plates which tie the ICGTs together. In at least one known reactor, two sets of lattices are attached to the shroud and tie the ICGTs together to reduce the FIV to an acceptable level. Tying the ICGTs together changes the natural frequency of the ICH/ICGT assemblies. Thus, the FIV may be reduced by connecting the ICGTs.

The known restraint structures are expensive to fabricate and are difficult to install. It would be desirable to provide a simpler but effective restraint configuration for ICH/ICGT assemblies. Of course, such a restraint should not add significant fabrication and maintenance costs to the reactor.

SUMMARY OF THE INVENTION

These and other objects may be attained by a restraint assembly which is a bolted lattice structure for preventing the in-core guide tubes from experiencing excessive flow induced vibrations. In one embodiment, the restraint assembly includes upper and lower restraint brackets secured to an in-core housing and in-core guide tube assembly. The restraint brackets are located approximately equal distance from the end supports of the in-core guide tube and in-core housing assembly. The upper restraint bracket is welded between sections of the in-core guide tube, and the lower restraint bracket is welded between the in-core guide tube and the in-core housing.

Each bracket includes four flanges, and each flange has tapped, or threaded, openings therein. Each bracket also includes cylindrical sections extending from the flanges, and in one embodiment, the cylindrical sections have inner and outer diameters which match the inner and outer diameters of the in-core housing and the in-core guide tube.

The brackets are interconnected by plates and threaded bolts. More specifically, the brackets of each ICGT and ICH assembly are connected to brackets of adjacent assemblies by plates and bolts. The bolts are sized and torqued to ensure that a sufficient preload is maintained to prevent any slippage. The bolt heads are tack welded to the restraint plates after final assembly.

The assembly also includes a shroud attachment plate and a restraint support bracket configured to be welded to a shroud. Specifically, the support bracket includes a flange for being welded to the shroud, and a connecting plate extends from the flange. A bolt is engaged to the attachment plate and bracket 306 by extending through aligned tapped openings in attachment plate and bracket. The attachment plate includes a transition portion for changing the orientation of the plate from substantially horizontal to substantially vertical. Openings in the transition plate align with openings in one of the brackets. In this matter, the assembly is secured to a shroud.

The above describe restraint assembly for supporting ICGT and ICH assemblies is simple to fabricate, install and remove. Such restraint assembly also provides adequate stiffness to reduce the natural frequency of the ICGT/ICH assemblies and thus reduce flow induced vibration to acceptable levels. Further, attachment of the restraint end brackets to the in-core guide tube can be performed in a shop and thus eliminate field welds, and the restraint plates which connect the brackets have only two lengths, which facilitates standardizing manufacturing. Also, the restraint plates have slotted openings to allow for as-built variations in the centerline distances between ICGTs, and the restraint end brackets are tapped to eliminate the use of nuts which reduces the number of parts. In addition, the tapped openings in the restraint end brackets are not completely tapped through in order to retain the body of the bolt should a bolt break, and the restraint support brackets attached to the shroud are oriented such that the bolts are vertical which improves remote installation and removal. Vertical support of the restraint plates is provided by the in-core housings.

BRIEF DESCRIPTION OF THE DRAWINGS

FIG. 2 is a perspective view of a ICGT/ICH assembly including restraint brackets in accordance with one embodiment of the present invention.

FIG. 3 is a perspective view of one of the restraint brackets shown in FIG. 2.

FIG. 4 is a cross sectional view of the restraint bracket through line A—A in FIG. 3.

FIG. 5 is a perspective view of a restraint plate in accordance with one embodiment of the present invention.

DETAILED DESCRIPTION

Figure 1:
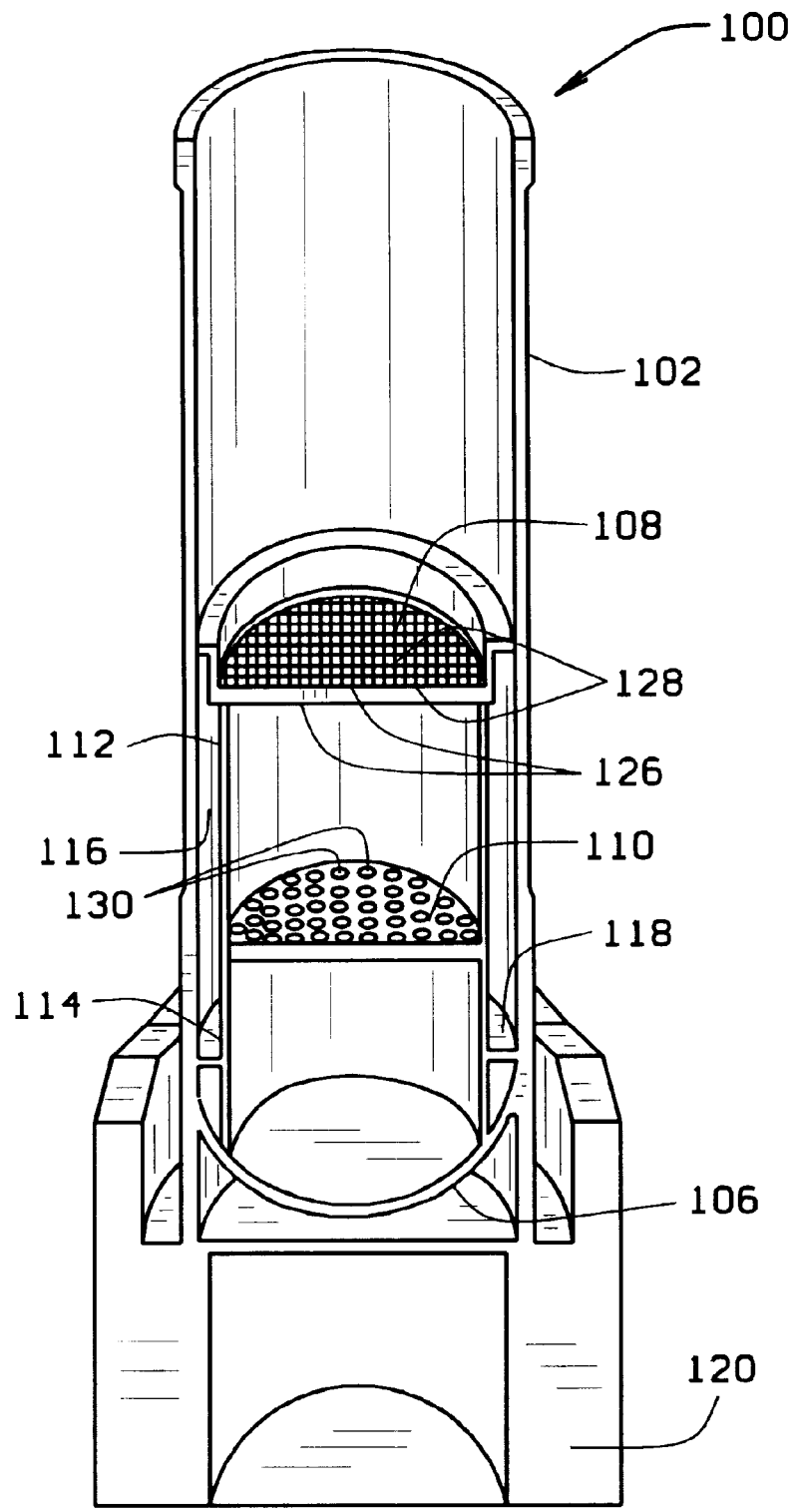
FIG. 1 is a schematic, partial cross section, illustration of a boiling water reactor.

FIG. 1 is a schematic, partial cross section, illustration of a boiling water reactor 100 including a reactor pressure vessel (RPV) 102. RPV 102 has a generally cylindrical shape and is closed at one end by a bottom head 106 and at its other end by removable top head (not shown). A top guide 108 is spaced above a core plate 110 within RPV 102. A shroud 112 surrounds core plate 110 and is supported by a shroud support structure 114. An annulus 116 is formed between shroud 112 and the wall of RPV 102. A baffle plate 118, which has a ring shape, extends around RPV 102 between shroud support structure 114 and the wall of RPV 102. RPV 102 is supported by an RPV support structure 120, and RPV 102 is, of course, filled with water.

RPV 102 is shown in FIG. 1 as being shut down with many components removed. For example, and in operation, many fuel bundles and control rods (not shown) are located in the area between top guide 108 and core plate 110. In addition, and in operation, steam separators and dryers and many other components (not shown) are located in the area above top guide 108.

Top guide 108 is a latticed structure including several top guide beams 126 defining top guide openings 128. Core plate 110 includes several recessed surfaces 130 which are substantially aligned with top guide openings 128 to facilitate positioning the fuel bundles between top guide 108 and core plate 110. Fuel bundles are inserted into the area between top guide 108 and core plate 110 by utilizing top guide openings 128 and recessed surfaces 130. Particularly, each fuel bundle is inserted through a top guide opening 128, and is supported horizontally by core plate 110 and top guide beams 126. The fuel is supported vertically by structure not shown.

A plurality of penetrations are formed in bottom head 106 so that components can extend within RPV 102. For example, in-core guide tubes (ICGT) and in-core housings (ICH) are long tubes which are welded together end to end to form an assembly, and the ICGT and ICH support and protect the in-core instrumentation. The bottom end of the ICH penetrates bottom head 106 and is welded thereto. The top end of the ICGT penetrates core plate 110, and the ICGT makes a slip fit with core plate 110. The distance between the upper and lower end supports is approximately 16 feet.

As described above, and during operation, fluid flows along the outside of the ICH/ICGT assembly. Particularly, fluid flows parallel to the axis of the assembly as well as across the assembly. Such flow causes flow induced vibrations (FIV) in the assembly. If unsupported between the ends, the ICH/ICGT assembly would experience vibration levels above acceptable limits.

The present invention is directed, in one aspect, to an in-core guide tube restraint assembly which is a bolted lattice structure for preventing the in-core guide tubes from experiencing excessive flow induced vibrations. Although specific embodiments of such restraints are described herein, many variations of such embodiments are contemplated and possible.

FIG. 2 is a perspective view of an ICGT and ICH assembly 150 including upper and lower restraint brackets 152 and 154, respectively, in accordance with one embodiment of the present invention. Assembly 150 includes a cylindrical in-core housing 156 and an in-core guide tube 158. Typically, restraint brackets 152 and 154 are located approximately equal distance from the end supports of the in-core guide tube and in-core housing assembly.

Upper restraint bracket 152 is welded between sections 160 and 162 of in-core guide tube 158. Welds 164 and 166 may be performed in the manufacturing shop rather than in the field. Lower restraint bracket 154 is welded between in-core guide tube 158 and in-core housing 156. Weld 168 between in-core guide tube 158 and lower restraint bracket 154 may be performed in the manufacturing shop, and weld 170 between lower restraint bracket 154 and in-core housing 156 typically is performed in the field after installation of in-core housing 156 through the reactor bottom head.

FIGS. 3 and 4 are a perspective view of upper restraint bracket 152 and a cross sectional view of bracket 152 through line A—A in FIG. 3, respectively. Upper restraint bracket 152 is identical to lower restraint bracket 154, and therefore, the following description of bracket 152 also describes bracket 154. As shown in FIG. 3, bracket 152 include four flanges 172, 174, 176, and 178. Each flange 172, 174, 176, and 178 includes tapped, or threaded, openings 180 and 182. Bracket 152 also includes cylindrical sections 184 and 186 extending from flanges 172, 174, 176, and 178. Cylindrical sections 184 and 186, in this embodiment, have inner and outer diameters which match the inner and outer diameters of in-core housing 156 and in-core guide tube 158.

Restraint end brackets 152 and 154 are machined from stainless steel forgings or castings. The ends of restraint end brackets 152 and 154, in-core guide tube 158, and in-core housing 156 are machined to provide a proper weld preparation for a full penetration, single sided weld. Also, the weld preparation should offset the effects of weld shrinkage/distortion on the function of ICGT/ICH assembly 150.

FIG. 5 is a perspective view of a restraint plate 200 in accordance with one embodiment of the present invention. Plates 200 are utilized to connect adjacent assemblies 150. More particularly, adjacent restraint end brackets 152 and 154 are connected together by restraint plates 200 which span between assemblies 150. Restraint plate 200 has a generally rectangular shape with slotted openings 202 at its ends. Slotted openings 202 accommodate variations in centerline distances between assemblies 150.

Figure 6:
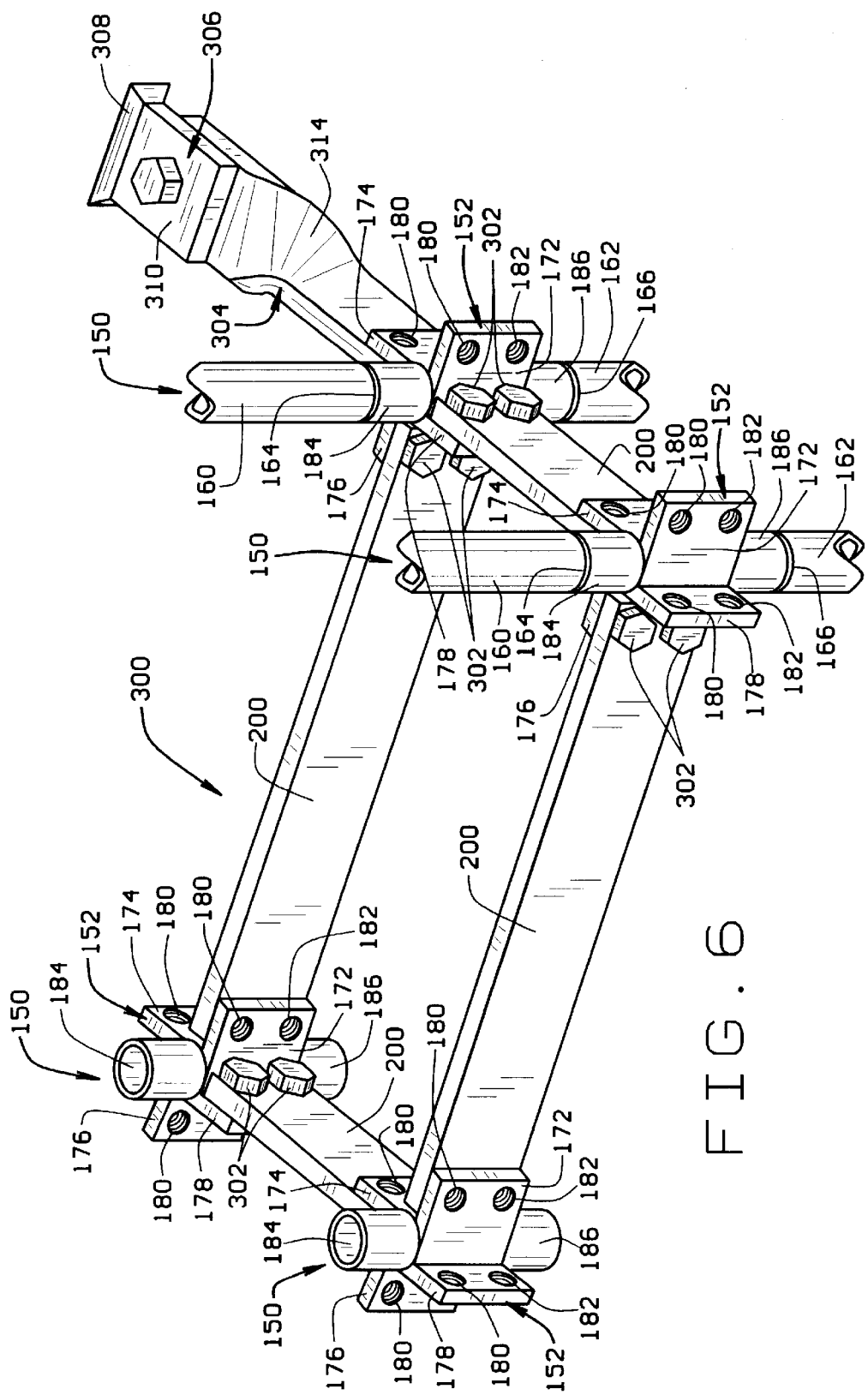
FIG. 6 is a perspective view of a restraint assembly in accordance with one embodiment of the present invention.

FIG. 6 is a perspective view of a restraint assembly 300 in accordance with one embodiment of the present invention. Assembly 300 includes brackets 152 interconnected by plates 200 using threaded bolts 302. Although not shown, an identical configuration would be used to interconnect brackets 154. More specifically, brackets 152 of each ICGT and ICH assembly 150 are connected to brackets 152 of adjacent assemblies 150 by plates 200 and bolts 302. Although not shown in FIG. 6, bolts 302 would be used to secure plates 200 to brackets 302 at each location where slotted openings 202 in plates 200 align with openings 180 and 182 in brackets 152. Bolts 302 are sized and torqued to ensure that a sufficient preload is maintained to prevent any slippage. The bolt heads are tack welded to restraint plates 152 after final assembly.

Restraint plates 200 have only two lengths. Minimizing the various lengths of restraint plates 200 facilitates standardizing manufacturing and reducing fabrication and inventory costs. In addition, by tapping (threaded) openings 180, 182 and 202, nuts are not required to maintain bolts 302 in engagement with brackets 152 and plates 200. Eliminating the need for nuts provides the advantage of reducing the number of parts and assembly time. In addition, tapped openings 180 and 182 in restraint end bracket 152 are not completely tapped through in order to retain the body of bolt 302 in that event that bolt 302 breaks. Therefore, any broken bolts are preventing from freely moving within the reactor pressure vessel.

Assembly 300 also includes a shroud attachment plate 304 and a restraint support bracket 306 configured to be welded to a shroud. Specifically, bracket 306 includes a flange 308 for being welded to the shroud, and a connecting plate 310 extends from flange 308. A bolt 312 is engaged to attachment plate 304 and bracket 306 by extending through aligned tapped openings in plate 304 and bracket 306. Plate 304 includes a transition portion 314 for changing the orientation of plate 304 from substantially horizontal to substantially vertical. Openings (not shown) in plate 304 align with openings 180 and 182 in bracket 152. In this matter, assembly 300 is secured to a shroud.

Figure 7:
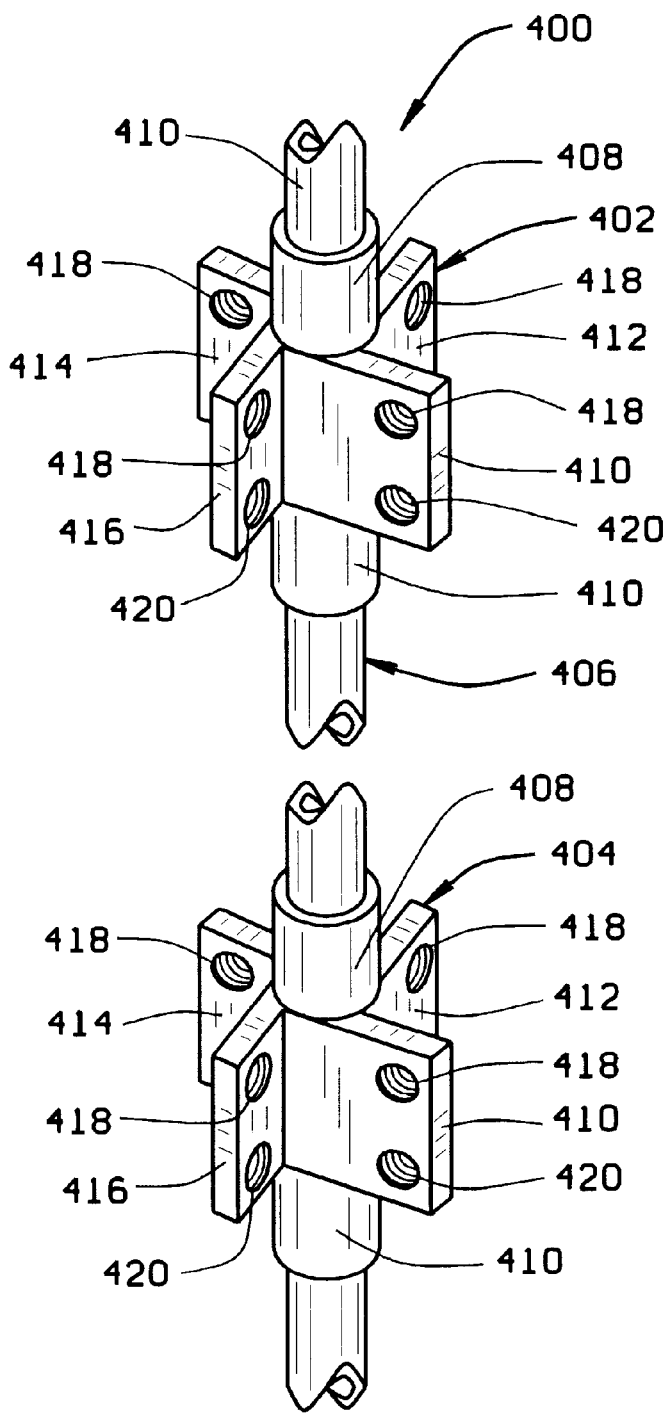
FIG. 7 is a perspective view of a ICGT/ICH assembly including restraint brackets in accordance with another embodiment of the present invention.

FIG. 7 is a perspective view of a ICGT/ICH assembly 400 including restraint brackets 402 and 404 in accordance with another embodiment of the present invention. Assembly 400 includes a cylindrical in-core guide tube 406, and brackets 402 and 404 are slipped over and welded to in-core guide tube 406. The welds between in-core guide tube 406 and brackets 402 and 404 may be performed in the manufacturing shop using socket or fillet welds.

Brackets 402 and 404 are substantially identical to brackets 152 and 154 with the exception that the inner diameter of cylindrical sections 408 and 410 is slightly larger than the outer diameters of in-core guide tube 406. Specifically, and as described above, restraint end brackets 402 and 404 are slipped over in-core guide tube 406, and then welded in position. An end of in-core guide tube 406 may be welded to an end of an in-core housing (not shown).

As with brackets 152 and 154, brackets 402 and 404 include four flanges 410, 412, 414, and 416, and each flange 410, 412, 414, and 416 has two tapped openings 418 and 420 therein. Brackets 402 and 404 are configured to be used in a restraint assembly identical to restraint assembly 300 shown in FIG. 6.

The above described restraint assemblies for supporting ICGT and ICH assemblies is simple to fabricate, install and remove. Such restraint assemblies also provide adequate stiffness to reduce the natural frequency of the ICGT/ICH assemblies and thus reduce flow induced vibration to acceptable levels. Further, attachment of the restraint end brackets to the in-core guide tube can be performed in a shop which eliminates at least some field welds, and the restraint plates which connect the brackets have only two lengths, which facilitates standardizing manufacturing. Also, the restraint plates have slotted openings to allow for as-built variations in the centerline distances between ICGTs, and the restraint end brackets are tapped to eliminate the use of nuts which reduces the number of parts. In addition, the tapped openings in the restraint end brackets are not completely tapped through in order to retain the body of the bolt should a bolt break, and the restraint support brackets attached to the shroud are oriented such that the bolts are vertical which improves remote installation and removal. Vertical support of the restraint plates is provided by the in-core housings.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

We claim:

1. A restraint assembly for preventing in-core housing and in-core guide tube assemblies from experiencing excessive flow induced vibrations in a nuclear reactor, said restraint assembly comprising:

upper and lower restraint brackets secured to respective in-core housing and in-core guide tube assemblies; and restraint plates interconnecting at least some of said brackets.

2. A restraint assembly in accordance with claim 1 wherein said restraint brackets are located approximately equal distance from end supports of the in-core guide tube and in-core housing assembly.

3. A restraint assembly in accordance with claim 1 wherein said upper restraint bracket is welded between sections of the in-core guide tube, and said lower restraint bracket is welded between the in-core guide tube and the in-core housing.

4. A restraint assembly in accordance with claim 1 wherein said upper and lower restraint brackets are slipped over and welded to the in-core guide tube.

5. A restraint assembly in accordance with claim 1 wherein each of said brackets comprises a plurality of flanges, each of said flanges having tapped openings therein, each bracket further comprising cylindrical sections extending from said flanges.

6. A restraint assembly in accordance with claim 1 wherein said restraint plates interconnecting to at least some of said brackets by bolts.

7. A restraint assembly in accordance with claim 1 further comprising a shroud attachment plate and a restraint support bracket configured to be welded to a shroud, said shroud attachment plate secured to said restraint support bracket.

8. A restraint assembly in accordance with claim 1 wherein each of said restraint plates comprises a plurality of slotted openings therein.

9. A restraint assembly in accordance with claim 5 wherein an inner diameter of each of said cylindrical sections is substantially the same as an inner diameter of the in-core housing and the in-core guide tube.

10. A restraint assembly in accordance with claim 9 wherein an outer diameter of each of said cylindrical sections is substantially the same as an outer diameter of the in-core housing and the in-core guide tube.

11. A restraint assembly in accordance with claim 5 wherein an inner diameter of each of said cylindrical sections is slightly greater than an outer diameter of the in-core housing and the in-core guide tube.

12. A restraint assembly in accordance with claim 11 wherein an outer diameter of each of said cylindrical sections is greater than an outer diameter of the in-core housing and the in-core guide tube.

13. A restraint assembly in accordance with claim 5 wherein said openings in said flanges are at least partially threaded.

14. A restraint assembly in accordance with claim 5 comprising four flanges.

15. A restraint assembly for preventing in-core housing and in-core guide tube assemblies from experiencing excessive flow induced vibrations in a nuclear reactor, said restraint assembly comprising:

upper and lower restraint brackets secured to respective in-core housing and in-core guide tube assemblies, each said upper and lower bracket comprising a plurality of flanges and a cylindrical section extend from each flange, said flanges having tapped openings therein; and restraint plates interconnecting at least some of said brackets.

16. A restraint assembly in accordance with claim 15 wherein said restraint brackets are located approximately equal distance from end supports of the in-core guide tube and in-core housing assembly.

17. A restraint assembly in accordance with claim 15 wherein said upper restraint bracket is welded between sections of the in-core guide tube, and said lower restraint bracket is welded between the in-core guide tube and the in-core housing.

18. A restraint assembly in accordance with claim 15 wherein said upper and lower restraint brackets are positioned over and welded to the in-core guide tube.

19. A restraint assembly in accordance with claim 15 further comprising a shroud attachment plate and a restraint support bracket configured to be welded to a shroud, said shroud attachment plate secured to said restraint support bracket.

20. A restraint assembly in accordance with claim 15 wherein each of said restraint plates comprises a plurality of slotted openings therein.

\* \* \* \* \*